United States Patent
Purushothaman

(10) Patent No.: US 10,616,280 B2
(45) Date of Patent: Apr. 7, 2020

(54) NETWORK SECURITY SYSTEM WITH COGNITIVE ENGINE FOR DYNAMIC AUTOMATION

(71) Applicant: BANK OF AMERICA CORPORATION, Charlotte, NC (US)

(72) Inventor: Sasidhar Purushothaman, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 177 days.

(21) Appl. No.: 15/793,659

(22) Filed: Oct. 25, 2017

(65) Prior Publication Data
US 2019/0124114 A1    Apr. 25, 2019

(51) Int. Cl.
*H04L 29/06* (2006.01)
*H04L 12/26* (2006.01)
*H04L 12/24* (2006.01)

(52) U.S. Cl.
CPC ........... *H04L 63/20* (2013.01); *H04L 41/145* (2013.01); *H04L 43/04* (2013.01); *H04L 43/50* (2013.01); *H04L 63/1408* (2013.01); *H04L 63/1425* (2013.01); *H04L 63/1433* (2013.01)

(58) Field of Classification Search
CPC . H04L 63/1425; H04L 63/1433; H04L 63/20; H04L 63/0263; H04L 63/1408; G06F 9/455
See application file for complete search history.

(56) References Cited

U.S. PATENT DOCUMENTS

| | | | |
|---|---|---|---|
| 5,907,709 A | 5/1999 | Cantey et al. | |
| 6,738,908 B1* | 5/2004 | Bonn | H04L 29/06 707/999.009 |
| 6,826,698 B1 | 11/2004 | Minkin et al. | |
| 6,829,585 B1 | 12/2004 | Grewal et al. | |
| 7,120,647 B2 | 10/2006 | Venkatesh et al. | |
| 7,174,563 B1* | 2/2007 | Brownlie | G06F 21/33 709/223 |
| 7,260,844 B1* | 8/2007 | Tidwell | G06F 21/577 726/22 |
| 7,383,578 B2 | 6/2008 | Blake et al. | |

(Continued)

OTHER PUBLICATIONS

Kyoungho An, Resource Management and Fault Tolerance Principles for Supporting Distributed Real-time and Embedded Systems in the Cloud, Dec. 3, 2012, ACM, pp. 1-6. (Year: 2012).*

(Continued)

*Primary Examiner* — Luu T Pham
*Assistant Examiner* — Fahimeh Mohammadi
(74) *Attorney, Agent, or Firm* — Michael A. Springs; Moore & Van Allen PLLC; Nicholas C. Russell

(57) ABSTRACT

Embodiments of the present invention provide an automated network security system for dynamically managing network security rules. The system uses a cognitive engine to capture network traffic and analyze behavioral data about said network traffic. Based on analysis of the behavioral data, the system may identify one or more vulnerabilities in the network security system and determine one or more changes to the network security rules to remedy the one or more vulnerabilities. The system further uses a robotic process automation system to test, simulate, and implement the one or more changes to the network security rules for the network.

14 Claims, 4 Drawing Sheets

(56) References Cited

U.S. PATENT DOCUMENTS

| | | | |
|---|---|---|---|
| 7,426,654 B2 | 9/2008 | Adams, Jr. et al. |
| 7,431,202 B1 | 10/2008 | Meador et al. |
| 7,607,066 B2 | 10/2009 | Gertz et al. |
| 7,626,938 B1 | 12/2009 | Orr et al. |
| 7,680,809 B2 | 3/2010 | Deng et al. |
| 7,685,067 B1 | 3/2010 | Britto et al. |
| 7,752,554 B2 | 7/2010 | Biggs et al. |
| 7,861,252 B2 | 12/2010 | Uszok et al. |
| 7,882,394 B2 | 2/2011 | Hosek et al. |
| 7,937,624 B2 | 5/2011 | Qing et al. |
| 7,954,143 B2 | 5/2011 | Aaron |
| 7,966,654 B2 | 6/2011 | Crawford |
| 7,966,655 B2 | 6/2011 | Acharya et al. |
| 7,966,659 B1 | 6/2011 | Wilkinson et al. |
| 7,973,508 B2 | 7/2011 | Le |
| 8,065,719 B2 | 11/2011 | Yang |
| 8,082,471 B2 | 12/2011 | Khan |
| 8,099,774 B2 | 1/2012 | Abzarian et al. |
| 8,171,406 B1 | 5/2012 | Newstadt et al. |
| 8,239,674 B2 | 8/2012 | Lee et al. |
| 8,285,643 B2 | 10/2012 | Isaacson et al. |
| 8,285,652 B2 | 10/2012 | Biggs et al. |
| 8,397,282 B2 | 3/2013 | Turley et al. |
| 8,407,670 B2 | 3/2013 | Hegde et al. |
| 8,418,240 B2 | 4/2013 | Wool |
| 8,448,139 B2 | 5/2013 | Ghosh |
| 8,508,336 B2 | 8/2013 | Giobbi et al. |
| 8,515,958 B2 | 8/2013 | Knight |
| 8,549,643 B1 | 10/2013 | Shou |
| 8,566,169 B2 | 10/2013 | Bohanan et al. |
| 8,572,733 B1 | 10/2013 | Rockwood |
| 8,588,767 B2 | 11/2013 | Fujimoto et al. |
| 8,700,414 B2 | 4/2014 | Rothermel et al. |
| 8,745,698 B1 | 6/2014 | Ashfield et al. |
| 8,751,559 B2 | 6/2014 | Richardson et al. |
| 8,793,578 B2 | 7/2014 | Mounty et al. |
| 8,819,825 B2 | 8/2014 | Keromytis et al. |
| 8,849,907 B1 | 9/2014 | Hession et al. |
| 8,935,673 B1 | 1/2015 | Ashkenazi et al. |
| 8,955,743 B1 | 2/2015 | Block et al. |
| 8,976,697 B2 | 3/2015 | Kalkunte |
| 9,021,419 B2 | 4/2015 | Pana et al. |
| 9,024,993 B2 | 5/2015 | Hession et al. |
| 9,088,543 B2 | 7/2015 | Lemke et al. |
| 9,105,143 B1 | 8/2015 | Huggins et al. |
| 9,135,615 B1 | 9/2015 | Mutha |
| 9,183,106 B2 | 11/2015 | Rao et al. |
| 9,195,739 B2 | 11/2015 | Imig et al. |
| 9,201,646 B2 | 12/2015 | Balachandran |
| 9,215,213 B2 | 12/2015 | Bansal et al. |
| 9,216,509 B2 | 12/2015 | Renkis |
| 9,280,406 B2 | 3/2016 | Ghosh |
| 9,311,632 B1 | 4/2016 | Dent |
| 9,356,942 B1 | 5/2016 | Joffe |
| 9,356,957 B2 | 5/2016 | Keromytis et al. |
| 9,378,064 B2 | 6/2016 | Dees, Jr. et al. |
| 9,383,973 B2 | 7/2016 | Villar et al. |
| 9,412,073 B2 | 8/2016 | Brandt et al. |
| 9,450,901 B1 | 9/2016 | Smullen et al. |
| 9,451,056 B2 | 9/2016 | Assarpour et al. |
| 9,462,013 B1 | 10/2016 | Boss et al. |
| 9,471,474 B2 | 10/2016 | Gurumurthy et al. |
| 9,530,129 B2 | 12/2016 | Lanc |
| 9,555,544 B2 | 1/2017 | Bataller et al. |
| 9,600,456 B2 | 3/2017 | Sriganesh et al. |
| 9,626,721 B2 | 4/2017 | Granbery |
| 9,632,771 B2 | 4/2017 | Toub |
| 9,641,544 B1 * | 5/2017 | Treat ................ H04L 63/1425 |
| 9,647,968 B2 | 5/2017 | Smullen et al. |
| 9,660,959 B2 | 5/2017 | Hsu et al. |
| 9,665,467 B2 | 5/2017 | Angwin et al. |
| 9,667,596 B2 | 5/2017 | Halabi |
| 9,674,222 B1 | 6/2017 | Joffe |
| 9,686,186 B2 | 6/2017 | Liste et al. |
| 9,703,624 B2 | 7/2017 | Purushothaman et al. |
| 9,715,675 B2 | 7/2017 | Chakravarty et al. |
| 9,723,485 B2 | 8/2017 | Jones-Mcfadden |
| 9,817,967 B1 | 11/2017 | Shukla et al. |
| 9,923,908 B2 | 3/2018 | Boss et al. |
| 10,110,629 B1 | 10/2018 | Kruse et al. |
| 10,187,337 B2 | 1/2019 | Smullen et al. |
| 2002/0184528 A1* | 12/2002 | Shevenell ............ H04L 63/12 726/6 |
| 2003/0046583 A1* | 3/2003 | Goldman ............ H04L 63/0263 726/4 |
| 2004/0030931 A1 | 2/2004 | Chamandy et al. |
| 2004/0168173 A1 | 8/2004 | Cohen et al. |
| 2005/0044418 A1* | 2/2005 | Miliefsky ............ H04L 63/0272 726/4 |
| 2005/0076237 A1 | 4/2005 | Cohen et al. |
| 2005/0166072 A1 | 7/2005 | Converse et al. |
| 2006/0048218 A1 | 3/2006 | Lingafelt et al. |
| 2006/0090136 A1* | 4/2006 | Miller ................ G06F 9/45504 715/734 |
| 2006/0191010 A1* | 8/2006 | Benjamin ............ G06F 21/552 726/23 |
| 2007/0016945 A1 | 1/2007 | Bassett et al. |
| 2007/0143847 A1 | 6/2007 | Kraemer et al. |
| 2008/0168425 A1 | 7/2008 | Sen et al. |
| 2010/0223327 A1 | 9/2010 | Srivastava et al. |
| 2011/0131644 A1* | 6/2011 | Keanini ............ H04L 63/1416 726/11 |
| 2013/0227697 A1* | 8/2013 | Zandani ............ H04L 63/1433 726/25 |
| 2014/0181968 A1 | 6/2014 | Ge et al. |
| 2014/0359708 A1 | 12/2014 | Schwartz |
| 2015/0213369 A1 | 7/2015 | Brandt et al. |
| 2016/0006755 A1* | 1/2016 | Donnelly ............ H04L 63/0263 726/1 |
| 2016/0048502 A1 | 2/2016 | Montenegro et al. |
| 2016/0134653 A1* | 5/2016 | Vallone ............ H04L 63/1433 726/25 |
| 2016/0335016 A1 | 11/2016 | Kurian et al. |
| 2017/0173784 A1 | 6/2017 | Shah et al. |
| 2017/0177416 A1 | 6/2017 | Altman et al. |
| 2017/0228119 A1 | 8/2017 | Hosbettu et al. |
| 2017/0269972 A1 | 9/2017 | Hosabettu et al. |
| 2017/0270431 A1 | 9/2017 | Hosabettu et al. |
| 2017/0364355 A1 | 12/2017 | Nitschke et al. |
| 2018/0160309 A1 | 6/2018 | Turgeman et al. |
| 2018/0197123 A1 | 7/2018 | Parimelazhagan et al. |
| 2018/0285839 A1 | 10/2018 | Yang et al. |
| 2018/0329399 A1 | 11/2018 | Neelakandan et al. |
| 2019/0004932 A1 | 1/2019 | Misra et al. |
| 2019/0089740 A1* | 3/2019 | Hastings ................ H04L 63/20 |
| 2019/0102676 A1 | 4/2019 | Nazari et al. |
| 2019/0124114 A1 | 4/2019 | Purushothaman |
| 2019/0155225 A1 | 5/2019 | Kothandaraman et al. |
| 2019/0163916 A1 | 5/2019 | Steele et al. |
| 2019/0182289 A1 | 6/2019 | White |

OTHER PUBLICATIONS

Shankar Mahadevan et al., A Network Traffic Generator Model for Fast Network-on-Chip Simulation, Mar. 7-11, 2005, ACM, vol. 2, pp. 780-785. (Year: 2005).*

Lee Breslau et al., Advances in Network Simulation, IEEE, vol. 33, Issue: 5, May 2000, pp. 59-67. (Year: 2000).*

J. Burns et al., Automatic Management of Network Security Policy, Aug. 7, 2002, IEEE, pp. 12-26. (Year: 2002).*

* cited by examiner

NETWORK SECURITY SYSTEM WITH COGNITIVE ENGINE FOR DYNAMIC AUTOMATION

FIELD

The present invention relates to system, methods, and computer program products for an automated network security system for dynamically managing network security rules.

BACKGROUND

Network security systems require frequent updates to the set of rules that manage the flow of network traffic between an internal and external network. Updating said network security systems is a time-consuming and laborious process. In many cases, updates to a network security system occur only after vulnerabilities in the network security system have been identified. Utilizing a cognitive engine and a robotic process automation system to identify vulnerabilities, test updated rules, and update the network security system overcomes these problems.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for an automated network security system for dynamically managing network security rules. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may comprise receiving a set of rules associated with a network security system of a network. The system may also continuously monitor network traffic to collect behavioral data associated with the network security system. As the system monitors the network traffic, it will also analyze the behavior data to determine one or more vulnerabilities in the set of rules associated with the network security system. Based on its analysis of the behavioral data, the system can determine one or more changes to the set of rules associated with the network security system, wherein the one or more changes remove the one or more vulnerabilities in the set of rules associated with the network security system. Then, the system may generate a model network traffic, wherein the model network traffic is based off of the behavioral data. The system then initiates execution of a robotic process automation system, wherein the robotic process automation system is configured to generate a virtual testing environment for modeling the one or more changes to the set of rules associated with the network security system, wherein the virtual testing environment simulates an operating environment of the network and the network security system. Further, the robotic process automation system is also configured to simulate an operating environment of the network and the network security system, wherein simulating the operating environment comprises simulating the model network traffic in the virtual testing environment.

In additional or alternative embodiments, the system may be further configured to analyze the simulated model network traffic. Based on analyzing the simulated model network traffic, the system can determine that the one or more changes to the set of rules eliminated the one or more vulnerabilities in the network security system. The system may then alter the set of rules to incorporate the one or more changes.

In other embodiments, the system may also be configured to analyze the simulated model network traffic. Based on analyzing the simulated model network traffic, the system can determine that one or more new vulnerabilities in the set of rules associated with the network security system exist, wherein the one or more new vulnerabilities are different from the one or more vulnerabilities previously identified. Then, the system can determine one or more additional changes to the set of rules associated with the network security system, wherein the one or more changes remove the one or more new vulnerabilities in the set of rules associated with the network security system.

In additional or alternative embodiments, the system may be further configured to repeat until no new vulnerabilities are identified in the rules associated with the network security system.

In some embodiments of the invention, the behavioral data described above comprises at least a history of all network traffic (i) received into the network, (ii) sent from the network, and (iii) blocked by the network security system.

In still further embodiments of the invention, the one or more changes to the set of rules associated with the network security system comprises removing an exception from the set of rules.

In still further embodiments, analyzing the behavioral data comprises determining that there was a breach of the network security system.

BRIEF DESCRIPTION OF THE DRAWINGS

Figure 1:
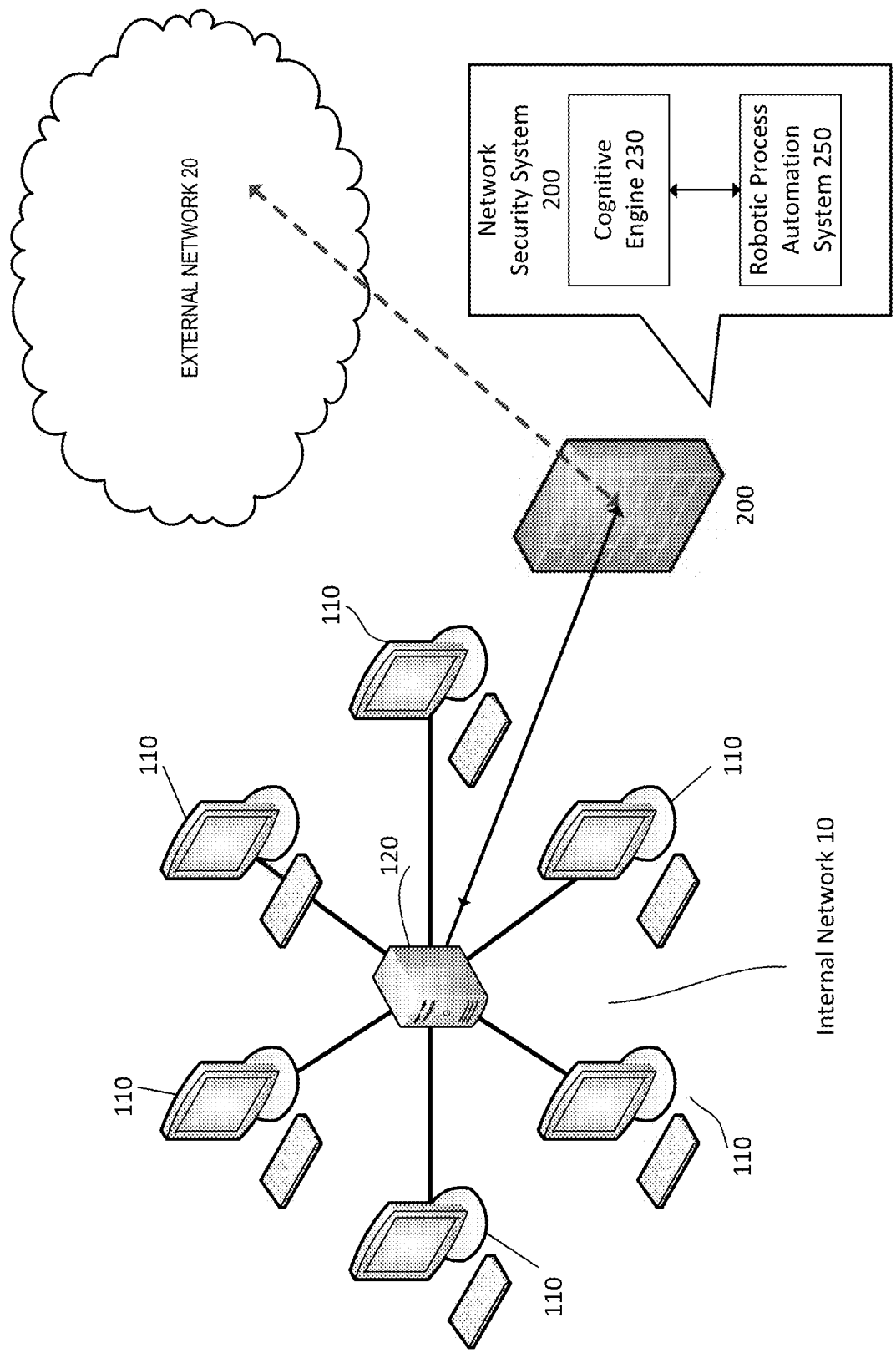
Figure 2:
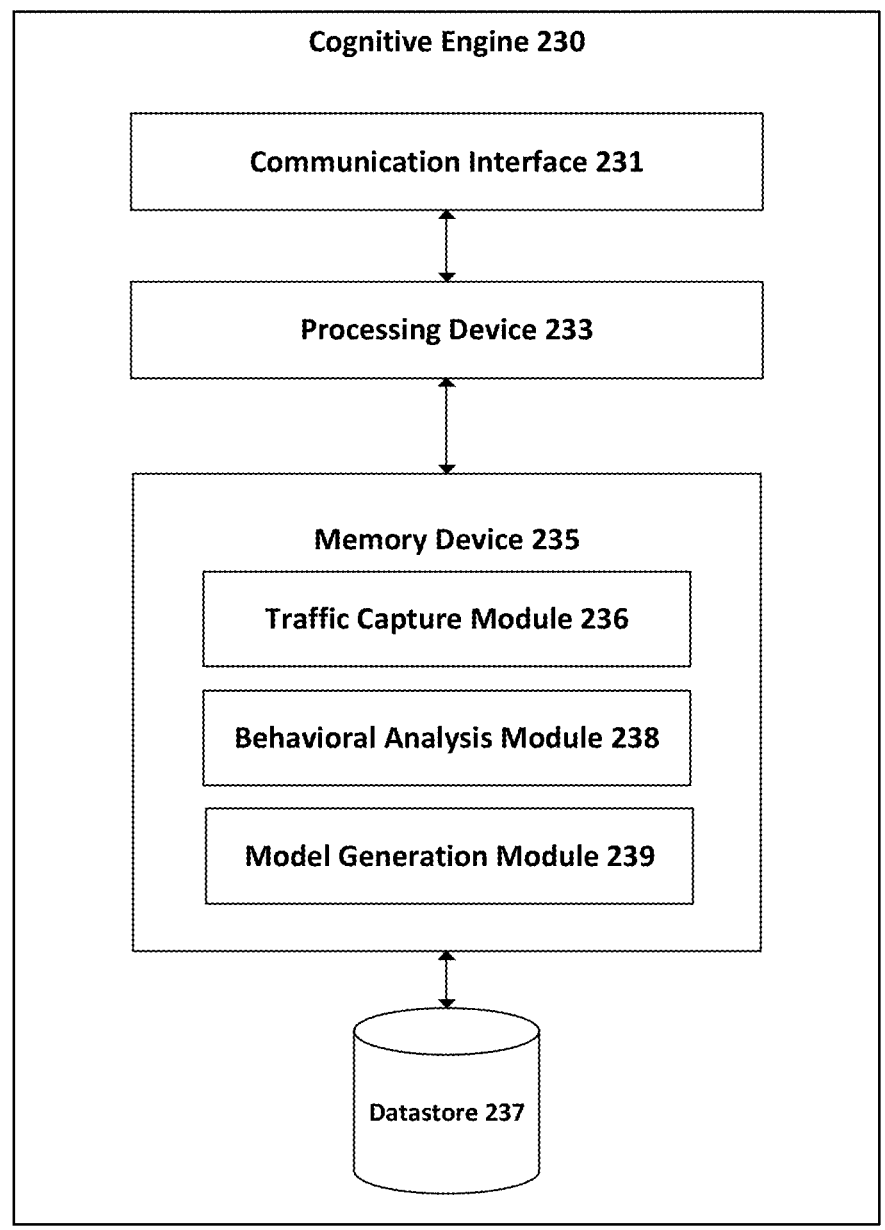
Figure 3:
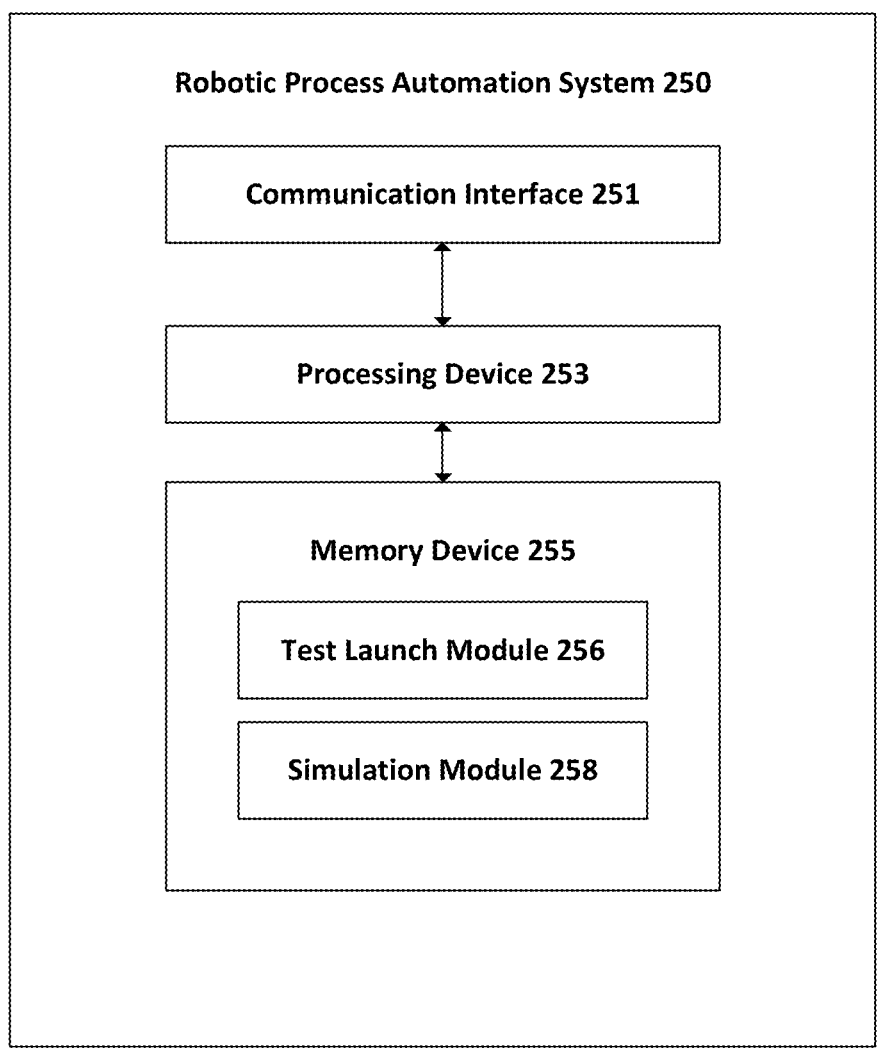
Figure 4:
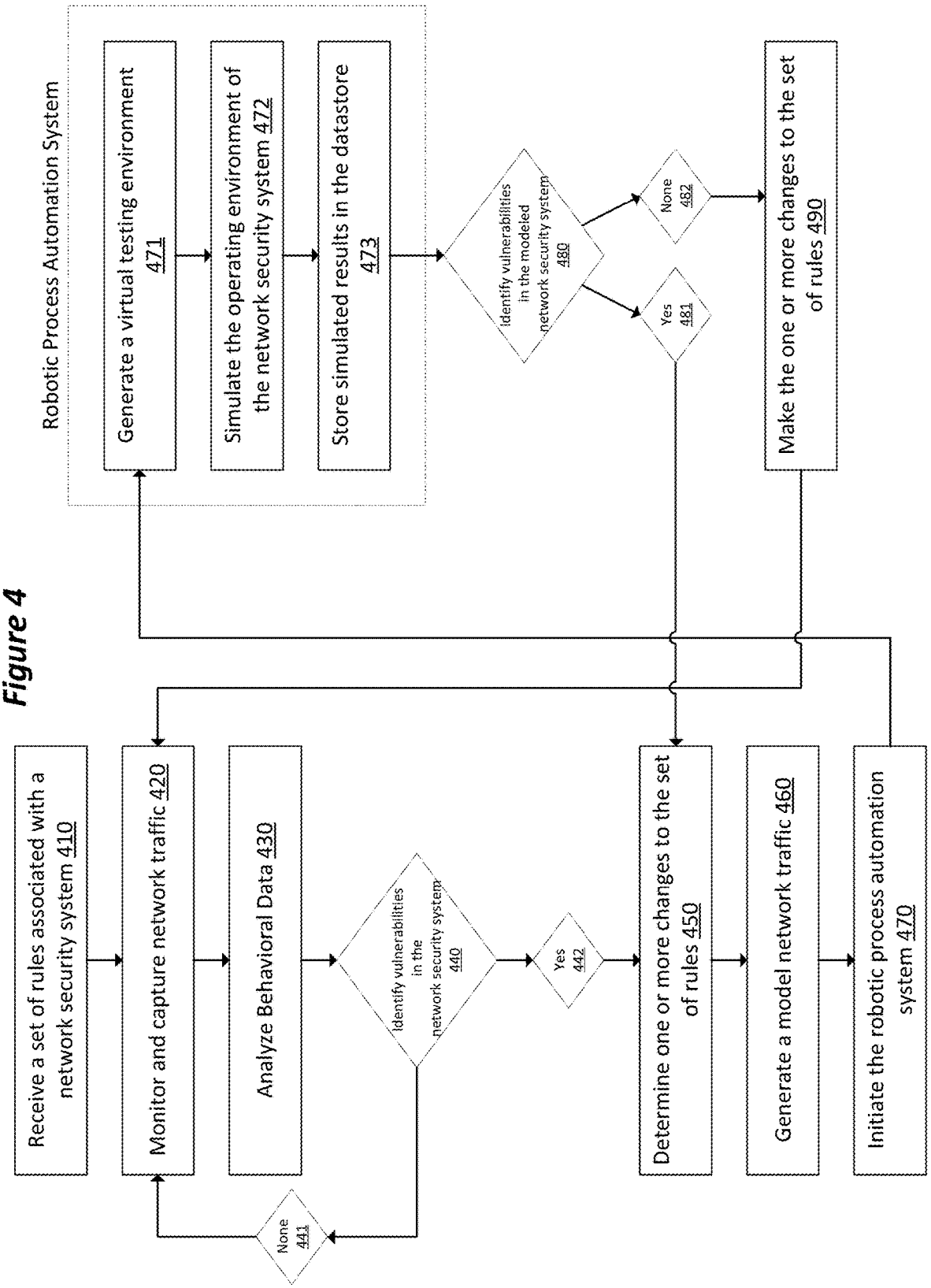

Having thus described embodiments of the invention in general terms, reference will now be made to the accompanying drawings, wherein:

FIG. 1 provides a block diagram illustrating a system environment for dynamically managing network security rules, in accordance with embodiments of the invention;

FIG. 2 provides a block diagram depicting a cognitive engine, in accordance with embodiments of the invention;

FIG. 3 provides a block diagram depicting a robotic process automation system, in accordance with embodiments of the invention; and FIG. 4 provides a flowchart depicting a process for dynamically managing network security rules, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shows. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

As described in greater detail with reference to the figures below, embodiments of the invention as described herein are systems, methods and computer program products that leverage the capabilities of robotic process automation (RPA) to automate tasks used in monitoring and updating a network security system. Robotic process automation may be employed as a highly customized software tool that automates certain tasks that previously required detailed user supervision. However, when coupled with the cognitive capabilities of the network security system as described in more detail herein, the robotic process automation as used in embodiments of the present invention makes updating and monitoring the network security system faster, more efficient, and more accurate.

FIG. 1 depicts a system diagram of an exemplary embodiment in which the present invention may be deployed. As shown in FIG. 1, the system will typically comprise an internal network 10 of user devices 110 in operative connection with a central server 120. The user devices 110 may be physically connected to the central server 110 by any viable electronic transmission means, including but not limited to Ethernet cables, wireless communication means such as Wi-Fi, Bluetooth, 4G LTE, or the like. In some embodiments, the internal network 10 of user devices 110 may be configured as a local area network (LAN). In other embodiments, the internal network may be configured as a wide area network (WAN). Such a configuration may be useful, for example, in embodiments where the internal network 10 of user devices 110 is a computer network belonging to an enterprise that has users spread across a number of disparate geographic locations.

FIG. 1 also depicts the internal network 10 of user devices 110 as connected to a central server 120, such as in a hub and spoke configuration. It should be understood that the central server 120 may actually be one or more servers operatively connected to one another. Alternatively, the user devices may be directly connected to one another by acceptable transmission means as discussed above, thereby eliminating the need for such a central server 120.

The internal network 10 of user devices 110 is also shown as operatively connected through the central server 120 to a network security system 200 As depicted in FIG. 1, the network security system 200 may be a firewall. FIG. 1 depicts a generic firewall, but it should be understood that embodiments of the present invention may employ any type of network security system, such as a packet-filtering firewall, a circuit-level gateway, stateful inspection firewall, application-level gateway, a multilayer inspection firewall, a combination of any of the foregoing, or the like. In some embodiments, the network security system 200 may be placed between the central server 120 and an external network 20 as shown in FIG. 1. However, the network security system may be employed at any point in the system between the user devices 110 and the external network 20. As used herein, the external network 20 may refer to any network located outside of the network security system 200 that communicates with the internal network 10, including but not limited to the Internet, email servers, WANs or LANs operated by an entity not under control of the network security system 200, or the like.

According to embodiments of the invention, the network security system operates according to a defined set of rules that permit or deny certain types of network traffic to flow between the external network 20 and the internal network 10 of user devices 110. In this respect, the rules are configured in such a manner as to allow all desirable network traffic to flow between the user devices 110 and the external network 120 and exclude any network traffic that may be pose a security threat to the network of user devices.

As will be described in more detail in the description of the remaining figures referenced herein, the network security system 200 is comprised of at least a cognitive engine 230 and a robotic process automation system 250. The cognitive engine 230 is responsible for analyzing network traffic and the set of rules associated with the network security system 200 to identify and correct vulnerabilities in the set of rules. As used herein, vulnerabilities in the set of rules associated with the network security system may refer to errors in the set of rules that permit network traffic through the network security system 200 that should be excluded. Examples of network traffic that should be excluded includes malware, viruses, worms, malicious code, certain cookies, spam, blocked websites, and the like. The cognitive engine may use artificial intelligence, machine learning, predictive analytics, and the like in order to identify and correct vulnerabilities in the set of rules associated with the network security system 200.

The robotic process automation system 250 that is part of the network security system 200 works in conjunction with the cognitive engine to test and repair vulnerabilities in the network security system 200. In this regard, the robotic process automation system 230 is able to perform repetitive tasks related to testing and simulating any changes to the set of rules associated with the network security system 200 in a virtual testing environment. Robotic process automation is particularly well suited for performing such tests and simulations because of its unique ability to accomplish specialized tasks quickly and efficiently. As such, and as will be described in more detail herein, the robotic process automation system is able to generate a virtual testing environment, simulate the operating environment (included modeled network traffic) of the network security system 200, and transmit the results to the cognitive engine in a manner that quickly and efficiently allows the system to remedy vulnerabilities in the network security system 200.

FIG. 2 is a more detailed illustration of the cognitive engine 230 that is part of the network security system 200. As shown in FIG. 2, the cognitive engine 230 is comprised of a communication interface 231, a processing device 233, and a memory device 235. Stored on the memory device 235 are a traffic capture module 236, a behavioral analysis module 238, and a model generation module 239. The cognitive engine 230 may additionally comprise a datastore 237. In some embodiments, the above elements may be comprised in a single unit, such as in a server. In other embodiments, the above elements may actually be one or more elements (e.g., one or more memory devices, one or more processing devices, and the like). In yet other embodiments, the elements may be spread across one or more devices or units, such as in a rack of servers.

The communication interface 231 as depicted in FIG. 2 permits the cognitive engine 230 to communicate with other elements of the network security system 200. In this regard, the communication interface may be configured to receive and transmit communications over any means of communication in which network traffic is exchanged, including but not limited to Wi-Fi, Ethernet, DSL, phone-line communication, Bluetooth, wireless communication such as 4G LTE, or the like. Additionally, the communication interface 231 must allow the cognitive engine to interact and send/receive information to the robotic process automation system 250. Such communications may be conducted over any of the channels as described above.

The cognitive engine 230 also comprises one or more processing devices 233. The one or more processing devices 233 is responsible for handling the various tasks the cognitive engine 230 is required to perform. In this regard, the processing device 233 may execute analytical tasks performed by the modules stored on the one or more memory devices 235 as described herein.

As noted, the cognitive engine 230 also includes one or more memory devices 235. The one or more memory devices 235 may further comprise a series of modules that for performing the various tasks required of the cognitive engine 230 in order for the system to work. In particular, the one or more memory devices 235 comprises a traffic capture module 236, behavioral analysis module 238, and a model generation module 239. In accordance with embodiments of the invention, the term "module" with respect to the system may refer to a hardware component of the system, a software component of the system, or a component of the system that includes both hardware and software. As used herein, a module may include one or more modules, where each module may reside in separate pieces of hardware or software.

The traffic capture module 236 is responsible for capturing the network traffic exchanged between the internal network 10 of user devices 110 and the external network 20. The traffic capture module 236 is configured to capture traffic entering the network security system from both the internal network 10 and the external network 20. Moreover, the traffic capture module may be further configured to capture traffic that was prevented from entering or exiting the internal network 10 under the rules associated with the network security system 200. For example, if the rules associated with the network security system 200 prevent certain malicious code from entering the internal network 10 from the external network 20, the traffic capture module may quarantine the excepted malicious code in the datastore 237 or other like storage area.

The cognitive engine also comprises a behavioral analysis module 238. The behavioral analysis module 238 is responsible for analyzing the behavior of the system to identify patterns in the network traffic, determine whether the rules associated with the network security system 200 are adequately routing network traffic (e.g., excluding unwanted traffic such as malicious code and permitting all other traffic to pass), predict future network traffic based on identified patterns, identify vulnerabilities in the rules associated with the network security system 200 (e.g., the behavioral analysis module 238 will look at predicted future network traffic, which may include potential unwanted traffic, and determine that the rules will not exclude the potential unwanted traffic). The behavioral analysis module further can identify one or more changes to the set of rules associated with the network security system 200 that will remedy any vulnerabilities it has identified. As will be discussed in more detail below, the cognitive engine 230 is capable of performing the above functions not only on captured network traffic, but on modeled network traffic as well. In this regard, the cognitive engine is able to determine how one or more changes to the set of rules associated with the network security system 200 will affect modeled network traffic, and whether an additional one or more changes to the set of rules will be needed to remedy remaining vulnerabilities in the network security system 200.

As shown in FIG. 2, the cognitive engine 230 also comprises a model generation module 239. The model generation module is responsible for generating a model in which the system can simulate the operating environment of the network security system 200. This may comprise generating a model network traffic, wherein the model network traffic is based off identified patterns in the network traffic determined by the behavioral analysis module 238. As noted above, the model network traffic will be used in a virtual testing environment to simulate the operating environment of the network security system 200.

FIG. 2 also depicts the cognitive engine 230 comprising a datastore 237. The datastore 237 is used to store the data necessary for the modules described above to perform their prescribed functions. For example, the datastore may hold the network traffic captured by the traffic capture module 236. In this regard, the behavioral analysis module 238 will have access to the captured network traffic in the datastore 237 in order for the behavioral analysis module 238 to identify patterns in the captured network traffic.

As noted above, the network security system 200 comprises a robotic process automation system 250 in addition to the cognitive engine 230. Together, the cognitive engine 230 and the robotic process automation system 250 as described herein provides the system the ability to capture and analyze network traffic, determine patterns in the traffic to generate a model network traffic, make one or more changes to the set of rules associated with the network security system 200, and simulate the one or more changes using the model network traffic. In this regard, the system is able to make changes to correct vulnerabilities in the network security system 200 before those vulnerabilities are identified. Indeed, the dynamic nature of this system allows the system to constantly update, change, or otherwise modify the set of rules associated with the network system without a security breach or other vulnerability having occurred.

The robotic process automation system 250 is illustrated in FIG. 3. As shown in FIG. 3, the robotic process automation system 250 comprises a communication interface 251, processing device 253, and a memory device 255 further comprising a test launch module 256 and a simulation module 258.

The communication interface 251 is similar to the communication interface 230 described above with respect to the cognitive engine 231. Like the cognitive engine 230 communication interface 231, the robotic process automation system 250 communication interface 251 may be configured to communicate via Wi-Fi, Ethernet, DSL, phone-line communication, Bluetooth, wireless communication such as 4G LTE, or the like. The communication interface is primarily responsible for receiving communications from the cognitive engine 230 (e.g., to start a testing simulation) and for transmitting data from simulations and any other processes run by the robotic process automation system 250.

The robotic process automation system 250 also comprises one or more processing devices 253. The one or more processing devices 253 is responsible for handling the various tasks the robotic process automation system 250 is required to perform. In this regard, the processing device 253 may execute the tasks performed by the modules stored on the one or more memory devices 255 as described herein.

As noted, the robotic process automation system 250 also includes one or more memory devices 255. The memory device may further comprise a series of modules for performing the various tasks required of the robotic process automation system 250 in order for the system to work. In particular, the one or more memory devices 255 comprise a test launch module 256 and a simulation module 258.

The test launch module is responsible for generating a virtual testing environment in which the system can simulate network traffic to help determine whether the one or more changes to the set of rules associated with the network security system 200 successfully eliminated the one or more vulnerabilities identified by the behavioral analysis module 238 described above. The virtual testing environment may comprise one or more virtual machines capable of simulating the operating systems of the user devices 110 on the internal network 10, the network security system 200, and the external network 20. In this respect, the system is capable of testing and simulating changes to the one or more rules associated with the network security system 200 in a completely virtual environment, thereby preventing the any introduction of vulnerabilities into the network resulting from testing the one or more changes on the actual network security system 200.

As shown in FIG. 3, the robotic process automation system 250 also comprises a simulation module 258. The simulation module 258 is responsible for simulating the operating environment of the network security system 200 by running the model network traffic received from the model generation module 239 of the cognitive engine 230 in the virtual testing environment. The simulation module 258 may run several different simulations using one or more model network traffics in order to determine whether the one or more changes to the set of rules associated with the network security system 200. The simulation module 258 will also transmit the results of each simulation back to the cognitive engine 230, where it can be stored in the datastore 237 and the analyzed by the behavior analysis module 238.

The robotic process automation system is particularly well suited for performing testing and simulation because it can be platform agnostic and work with any type of network security system 200. In this regard, the robotic process automation system 200 needs only to generate the virtual testing environment and to execute the model network traffic. The robotic process automation system 200 is able to accomplish the above tasks based solely on information it receives from cognitive engine 230.

FIG. 4 is a flowchart illustrating an exemplary embodiment of the invention. At block 410, the system first receives a set of rules associated with a network security system 200. As detailed above, the set of rules associated with the network security system 200 are designed so as to permit or deny certain types of network traffic to flow between an external network 20 and an internal network 10 of user devices 110. In this respect, the set of rules are configured in such a manner so as to allow the internal network 10 and the external network 20 to exchange information, but to exclude traffic that may be deemed a security threat. Such security threats may include security threats that originate from the external network 20, such as malicious code, blocked websites, viruses, worms, illicit content, and the like. Similarly, the set of rules associated with the network security system 200 may be configured to prevent certain types of network traffic originating in the internal network 10 from travelling to the broader external network 20. For example, the set of rules may be configured to block certain confidential materials, unencrypted documents or emails, and the like. The set of rules associated with the network security system may be stored in a datastore in the network security system 200 itself, such as datastore 237 in the cognitive engine 230.

Once the system has the set of rules associated with the network security system 200, the system can begin monitoring the network traffic exchanged between the internal network 10 of user devices 110 and the external network 20. This is depicted at block 420 in FIG. 4. As mentioned above, the traffic capture module 236 in the cognitive engine 230 is responsible for capturing the network traffic exchanged between the internal network 10 and the external network 20. The traffic capture module 236 must be bi-directional, meaning that it is capable of capturing traffic that enters the network security system 200 from both the internal network 10 and the external network 20. The traffic capture module 236 must also be able to capture the network traffic that leaves the network security system 200 so that the behavioral analysis module 238 can determine what traffic has been excluded under the set of rules associated with the network security system 200.

At block 430, the system analyzes behavioral data. As noted above, the behavioral analysis module 238 is responsible for analyzing the behavioral data of the network traffic captured by the traffic capture module 236. In some embodiments of the invention, the behavioral analysis module 238 may use artificial intelligence, machine learning or the like to aid in analyzing the behavior of the network security system 200. In this regard, the system may "learn" how the network security system 200 allows and/or excludes certain types of network traffic based on its set of rules. In addition, the artificial intelligence, machine learning or like system employed by the behavioral analysis module 238 can learn how the set of rules associated with the network security system 200 wrongfully allow and/or exclude certain types of network traffic. For example, the behavioral analysis module 238 may analyze excluded network traffic and compare it to network traffic allowed through the network security system 200. The behavioral analysis module 238 may determine that there is no difference between elements certain excluded traffic and traffic that was allowed, thereby determining that such network traffic was wrongfully excluded. As will be described in more detail below, such an instance may require an update to the set of rules associated with the network security system 200.

In some embodiments, the behavioral analysis module 238 may analyze the behavioral data of the network traffic and determine that a breach of the network security system 200 has occurred. In such embodiments, the behavioral analysis module 238 may determine that certain malicious code, viruses, spam, unauthorized users, or the like were wrongfully allowed from the external network 20 past the network security system 200. Once the system has determined that a breach of the network security system 200 has occurred, the system may respond in any number of ways to limit prevent harm to the internal network 10. For example, the system may automatically shut down all network traffic for a specified amount of time, trigger a notification to certain network administrators that a breach has occurred, quarantine any malicious code that gotten through the network security system 200, or the like.

Similarly, the behavioral analysis module 238 may determine based on its behavioral analysis of network traffic that vulnerabilities exist in the set of rules associated with the network security system. At block 440, the analysis described above is used to determine whether any such vulnerabilities exist in the network security system 200. If the behavioral analysis determines there are no such vulnerabilities (block 441), the system continues to monitor network traffic as described above with reference to block 420. Alternatively, if the system identifies that there are vulnerabilities in the set of rules associated with the network security system (block 442), the system will need to change the set of rules associated with the network security system 200.

At block 450, the system may determine one or more changes to the set of rules associated with the network security system 200 in order to correct or remedy the vulnerabilities identified at block 440. The one or more changes to the set of rules may comprise an entirely new rule to exclude network traffic that the behavioral analysis module 238 has identified may pose a security threat to the internal network 10. Alternatively, the one or more changes may comprise removing one or more rules that the behavioral analysis module 238 has determined are excessive or superfluous.

Once the system has determined one or more changes to the set of rules associated with the network security system 200, the system then generates a model network traffic as depicted at block 460. The model network traffic is generated by the model generation module 239 of the cognitive engine 230 as described above. In embodiments of the invention, the model network traffic is designed to simulate a typical network traffic that the network security system 200 would be expected to encounter. In this regard, the model network traffic allows the system to simulate the network security system 200 with one or more changes to the set of rules using the model network traffic. The model generation module 230 may base the model network traffic off of patterns identified in the network traffic captured by the traffic capture module in order to predict likely future network traffic. Additionally, if the one or more changes to the rules associated with the network security system 200 are designed to correct a specific vulnerability identified in the network security system 200, the model generation module 239 may generate model network traffic that mimics that particular vulnerability. For example, if the one or more changes to the model comprise a new rule designed to prevent a type of malicious code from entering the internal network 10, the model network traffic may include that specific type of malicious code. In this regard, when the robotic process automation system 250 runs simulations using the model network traffic, the system will be able to test whether the one or more changes to the set of rules associated with the network security system 200 adequately block the specific type of malicious code.

At block 470, after the model traffic has been generated, the system next initiates the robotic process automation system 250 described above with reference to FIG. 3. Initiating the robotic process automation system 250 may comprise initiating an executable file that launches the robotic process automation system 250. In some embodiments, initiating the robotic process automation system 250 may further comprise providing the robotic process automation system 250 with the model network traffic and the one or more changes to the set of rules associated with the network security system 200.

As noted above, the robotic process automation system is a customized system tailored to run repetitive simulations in a virtual testing environment mimicking the operating conditions of the network security system 200. As such, the first step for the robotic process automation system 250 to run is to generate the virtual testing environment, as illustrated at block 471. Generating the virtual testing environment may comprise creating one or more virtual machines that simulate the components of the network, including but not limited to the internal network 10 of user devices 110, the network security system 200 with one or more changes to the set of rules determined at block 450, and the external network 20.

At block 472, after the robotic process automation system 250 has generated the virtual testing environment, the robotic process automation system 250 next simulates the operating environment of the network security system 200 by running the model network traffic generated by the model generation module 239 at block 460. In this regard, the robotic process automation system 250 may run several simulations that are designed to emulate the types of network traffic the network security system 200 will be expected to encounter. In the virtual testing environment, the model network traffic will operate according to the same set of rules associated with the network security system 200 as the physical environment will encounter, should the one or more changes to the set of rules go into effect.

At block 473, the robotic process automation system stores the simulated results in the datastore 237 that is part of the cognitive engine 230. Accordingly, the cognitive engine 230 has easy access to the simulated network traffic and can analyze said traffic in order to determine whether the one or more changes to the rules simulated by the robotic process automation system 250 were effective in addressing the one or more vulnerabilities identified at block 440. In some embodiments, the robotic process automation store the simulated results in the datastore in real time (i.e. simulated network traffic will be stored in the datastore 237 while the robotic process automation system 250 is still running simulations). In other embodiments, the robotic process automation system 250 may wait until the simulations are complete before storing the results in the datastore 237.

Once the robotic process automation system 250 has completed it simulations and stored the results in the datastore 237, the cognitive engine 230 once again will analyze the simulated network traffic in the behavioral analysis module 236. At block 480, the behavioral analysis module 236 will identify vulnerabilities in the modeled network security system 200. In this regard, any vulnerabilities may be the same vulnerabilities identified at block 440, indicating that the one or more changes to the set of rules associated with the network security system 200 were ineffective in remedying the vulnerabilities. Alternatively, the system may identify one or more new vulnerabilities caused by the one or more changes to the set of rules. In either event, the system must determine one or more new changes to the set of rules in order to remedy the vulnerabilities identified at block 480. As shown in FIG. 4, at block 481, the system positively identified one or more vulnerabilities based on the simulations run by the robotic process automation system 250. In this case, the system returns to block 450, where it will determine on or more new changes to the set of rules associated with the network security system 200 to remedy the remaining vulnerabilities in the network security system 200. On the other hand, if no vulnerabilities are identified based on the simulations run by the robotic process automation system 250 (block 482), the system will make the one or more changes to the set of rules. Once the changes are made to the set of rules, the system can then return to block 420, where it will continue monitoring network traffic until the system identifies later vulnerabilities in the network security system, at which the above described process will restart.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An automated network security system for dynamically managing network security rules, the system comprising:
   one or more processor components;
   one or more memory components operatively coupled to the one or more processor components;
   computer programmable instructions stored on the one or more memory components and configured to cause the one or more processor components to:
   receive a set of rules associated with a network security system of a network;
   continuously monitor network traffic to collect behavioral data associated with the network security system, wherein the behavioral data comprises at least: a history of all network traffic: (i) received into the network, (ii) sent from the network, and (iii) blocked by the network security system;
   analyze the behavioral data to determine one or more vulnerabilities in the set of rules associated with the network security system;
   determine one or more changes to the set of rules associated with the network security system, wherein the one or more changes are configured to remove the one or more vulnerabilities in the set of rules associated with the network security system, wherein the one or more changes further comprises:
   adding at least one new rule to the set of rules designed to exclude network traffic posing a security threat; and
   removing at least one existing rule from the set of rules that is excessive;
   generate a model network traffic, wherein the model network traffic is designed to mimic the one or more vulnerabilities in the set of rules associated with the network security system;
   initiate execution of a robotic process automation system, wherein the robotic process automation script is configured to:
   generate a virtual testing environment for modeling the one or more changes to the set of rules associated with the network security system, wherein the virtual testing environment simulates an operating environment of the network and the network security system; and simulate an operating environment of the network and the network security system, wherein simulating the operating environment comprises simulating the model network traffic in the virtual testing environment;
analyze the simulated model network traffic;
determine, based on analyzing the simulated model network traffic, that one or more new vulnerabilities in the set of rules associated with the network security system exist, wherein the one or more new vulnerabilities are different from the one or more vulnerabilities previously identified; and
determine one or more additional changes to the set of rules associated with the network security system, wherein the one or more changes remove the one or more new vulnerabilities in the set of rules associated with the network security system.

2. The automated network security system of claim 1, wherein the system is further configured to:
   analyze the simulated model network traffic;
   determine, based on analyzing the simulated model network traffic, that the one or more changes to the set of rules eliminated the one or more vulnerabilities in the network security system;
   alter the set of rules to incorporate the one or more changes.

3. The system of claim 1, wherein the system is further configured to repeat until no new vulnerabilities are identified in the rules associated with the network security system.

4. The system of claim 1, wherein the one or more changes to the set of rules associated with the network security system comprises removing an exception from the set of rules.

5. The system of claim 1, wherein analyzing the behavioral data comprises determining that there was a breach of the network security system.

6. A computer program product for dynamically managing network security rules, the computer program product comprising at least one non-transitory computer readable medium comprising computer readable instructions, the instructions comprising instructions for:
   receiving a set of rules associated with a network security system of a network;
   continuously monitor network traffic to collect behavioral data associated with the network security system, wherein the behavioral data comprises at least: a history of all network traffic: (i) received into the network, (ii) sent from the network, and (iii) blocked by the network security system;
   analyzing the behavioral data to determine one or more vulnerabilities in the set of rules associated with the network security system;
   determining one or more changes to the set of rules associated with the network security system, wherein the one or more changes are configured to remove the one or more vulnerabilities in the set of rules associated with the network security system, wherein the one or more changes further comprises:
   adding at least one new rule to the set of rules designed to exclude network traffic posing a security threat; and
   removing at least one existing rule from the set of rules that is excessive;
   generating a model network traffic, wherein the model network traffic is designed to mimic the one or more vulnerabilities in the set of rules associated with the network security system;

initiating execution of a robotic process automation system, wherein the robotic process automation script is configured to:

generating a virtual testing environment for modeling the one or more changes to the set of rules associated with the network security system, wherein the virtual testing environment simulates an operating environment of the network and the network security system; and simulating an operating environment of the network and the network security system, wherein simulating the operating environment comprises simulating the model network traffic in the virtual testing environment;

analyzing the simulated model network traffic;

determining, based on analyzing the simulated model network traffic, that one or more new vulnerabilities in the set of rules associated with the network security system exist, wherein the one or more new vulnerabilities are different from the one or more vulnerabilities previously identified; and determining one or more additional changes to the set of rules associated with the network security system, wherein the one or more changes remove the one or more new vulnerabilities in the set of rules associated with the network security system.

7. The computer program product of claim 6, wherein the computer readable instructions further comprise instructions for:

analyzing the simulated model network traffic;

determining, based on analyzing the simulated model network traffic, that the one or more changes to the set of rules eliminated the one or more vulnerabilities in the network security system;

altering the set of rules to incorporate the one or more changes.

8. The computer program product of claim 6, wherein the computer readable instructions further comprise instructions for repeating until no new vulnerabilities are identified in the rules associated with the network security system.

9. The computer program product of claim 6, wherein the one or more changes to the set of rules associated with the network security system comprises removing an exception from the set of rules.

10. The computer program product of claim 6, wherein analyzing the behavioral data comprises determining that there was a breach of the network security system.

11. A computer implemented method for dynamically managing network security rules, the computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a set of rules associated with a network security system of a network;

continuously monitoring network traffic to collect behavioral data associated with the network security system, wherein the behavioral data comprises at least: a history of all network traffic: (i) received into the network, (ii) sent from the network, and (iii) blocked by the network security system;

analyzing the behavioral data to determine one or more vulnerabilities in the set of rules associated with the network security system;

determining one or more changes to the set of rules associated with the network security system, wherein the one or more changes are configured to remove the one or more vulnerabilities in the set of rules associated with the network security system, wherein the one or more changes further comprises:

adding at least one new rule to the set of rules designed to exclude network traffic posing a security threat; and removing at least one existing rule from the set of rules that is excessive;

generating a model network traffic, wherein the model network traffic is designed to mimic the one or more vulnerabilities in the set of rules associated with the network security system;

initiating execution of a robotic process automation system, wherein the robotic process automation script is configured to:

generating a virtual testing environment for modeling the one or more changes to the set of rules associated with the network security system, wherein the virtual testing environment simulates an operating environment of the network and the network security system; and simulating an operating environment of the network and the network security system, wherein simulating the operating environment comprises simulating the model network traffic in the virtual testing environment;

analyzing the simulated model network traffic;

determining, based on analyzing the simulated model network traffic, that one or more new vulnerabilities in the set of rules associated with the network security system exist, wherein the one or more new vulnerabilities are different from the one or more vulnerabilities previously identified; and determining one or more additional changes to the set of rules associated with the network security system, wherein the one or more changes remove the one or more new vulnerabilities in the set of rules associated with the network security system.

12. The computer implemented method of claim 11, the method further comprising:

analyzing the simulated model network traffic;

determining, based on analyzing the simulated model network traffic, that the one or more changes to the set of rules eliminated the one or more vulnerabilities in the network security system;

altering the set of rules to incorporate the one or more changes.

13. The computer implemented method of claim 11, wherein the computer readable instructions further comprise instructions for repeating until no new vulnerabilities are identified in the rules associated with the network security system.

14. The computer implemented method of claim 11, wherein the one or more changes to the set of rules associated with the network security system comprises removing an exception from the set of rules.

* * * * *